United States Patent [19]

Kotake

[11] Patent Number: 5,309,511
[45] Date of Patent: May 3, 1994

[54] PERSONAL COMMUNICATION SYSTEM

[75] Inventor: Siro Kotake, Hachioji, Japan

[73] Assignee: Kabushiki Kaisha Toshiba, Kanagawa, Japan

[21] Appl. No.: 911,665

[22] Filed: Jul. 9, 1992

[30] Foreign Application Priority Data

Jul. 10, 1991 [JP] Japan .................... 3-170230

[51] Int. Cl.⁵ .................. H04M 3/42; H04M 3/54
[52] U.S. Cl. ........................ 379/201; 379/357; 379/211
[58] Field of Search ........... 379/201, 357, 210, 211, 379/212, 194

[56] References Cited

U.S. PATENT DOCUMENTS

| | | | |
|---|---|---|---|
| 4,313,035 | 1/1982 | Jordan et al. | 179/18 |
| 4,680,785 | 7/1987 | Akiyama et al. | 379/57 |
| 4,752,951 | 6/1988 | Konneker | 379/211 |
| 4,852,156 | 7/1989 | Shigenaga | 379/172 |
| 4,961,217 | 10/1990 | Akiyama | 379/89 |
| 5,197,096 | 3/1993 | Sakuma et al. | 379/211 |

*Primary Examiner*—James L. Dwyer
*Assistant Examiner*—Hannah Lim
*Attorney, Agent, or Firm*—Finnegan, Henderson Farabow, Garrett & Dunner

[57] ABSTRACT

In a personal communication system in which a call is originated from a calling side terminal equipment using number information allocated to a called person and the call is processed on the called side terminal equipment as a personal call, the system comprises absence notifying section disposed on the called side terminal equipment, for sending absence notify information to the calling side terminal equipment when a predetermined absence notify request is entered during the processing of the personal call. Therefore, when a personal call is incoming, if the designated called person is absent, the calling person can recognize the absence of the called person and then can select cancellation of the personal call, proxy answer by another person, or transfer of the personal call, according to the calling person's will.

4 Claims, 19 Drawing Sheets

F : FR BIT

L : DC BAL BIT

D : D-CHAN BIT

E : D-ECHO-CHAN BIT

FA : AUX FR BIT

N : BIT SET TO N=FA BY BINARY (DSU→TE)

B1 : B-CHAN (1) BIT

B2 : B-CHAN (2) BIT

A : STARTING BIT

S : SPARE BIT

M : MULT-FR BIT

| PTN | PSI | PASS WD |
|---|---|---|
| (15 DIGITS AT MAX) | (40 DIGITS AT MAX) | (4 DIGITS) |

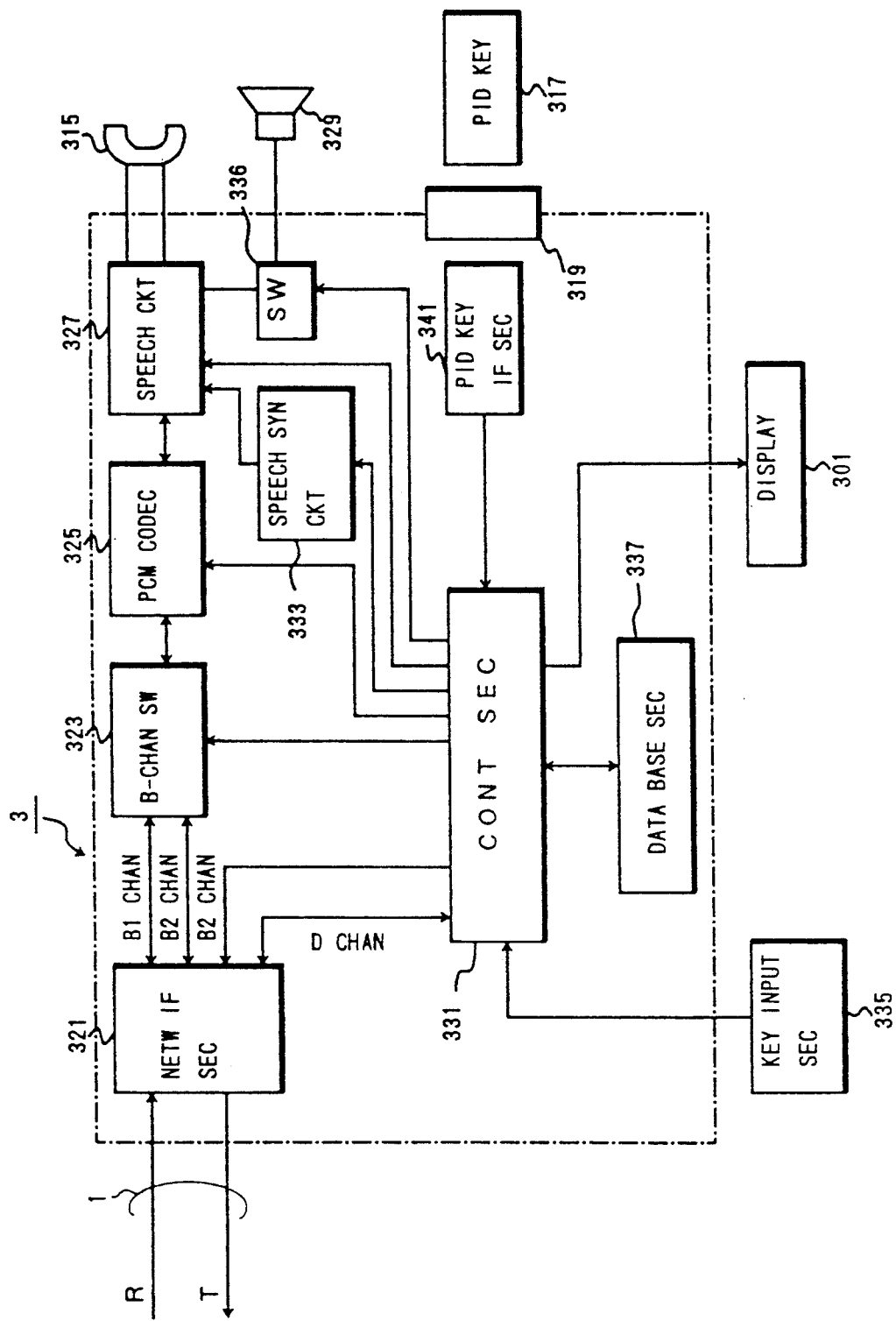
F I G. 6

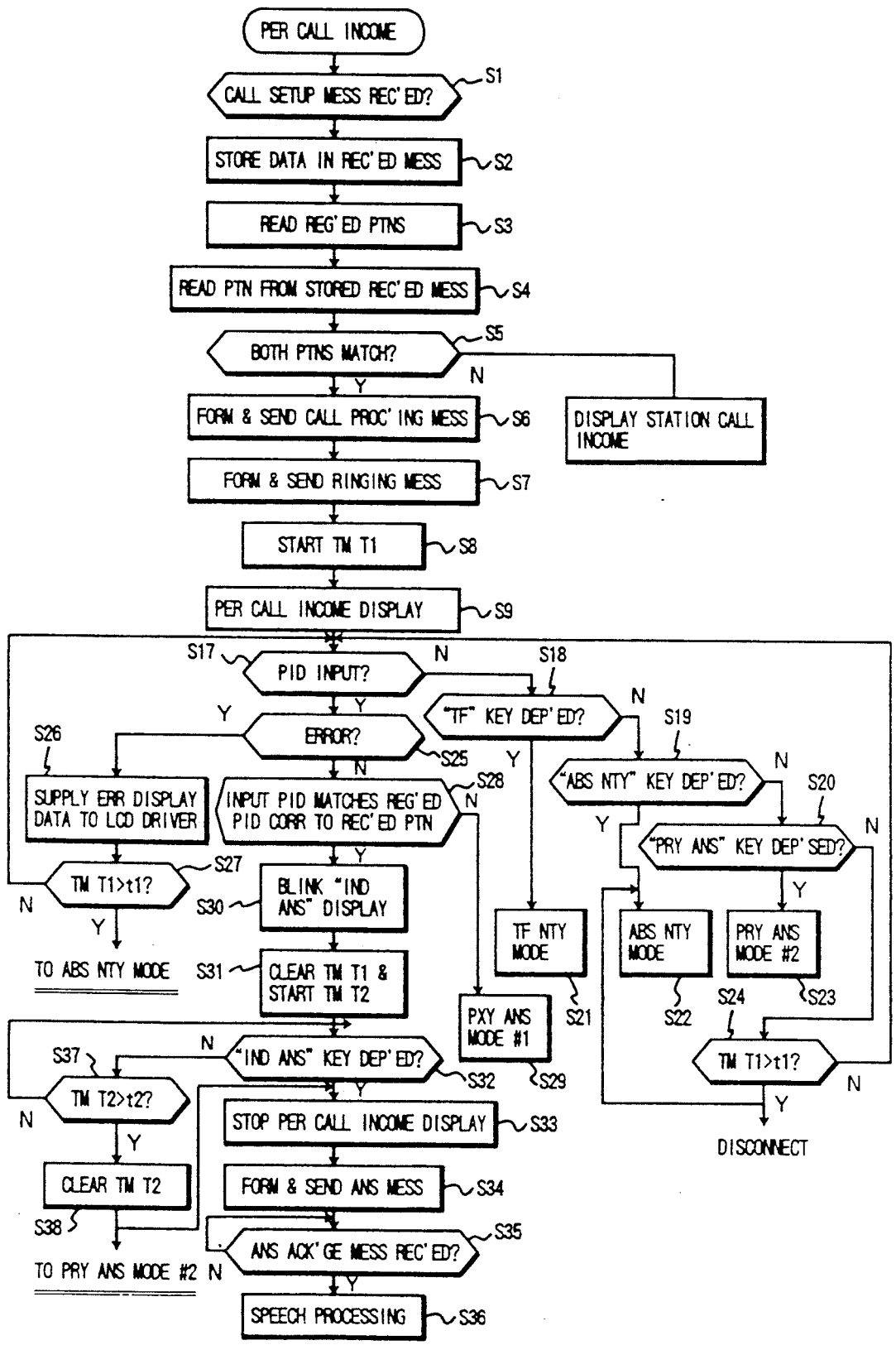
F I G. 7

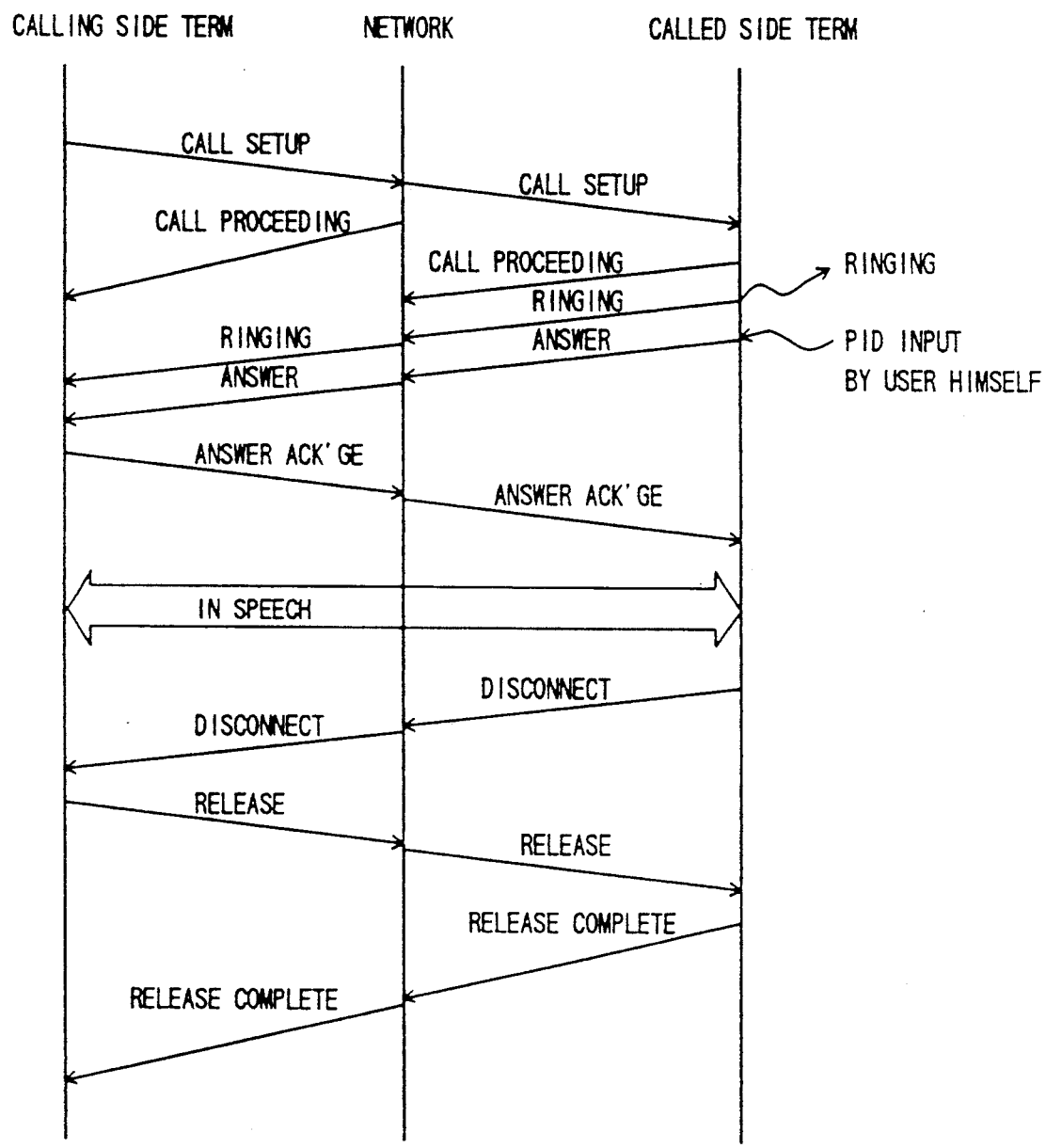
F I G. 15

TRANSFER NOTIFY

○○○-××××

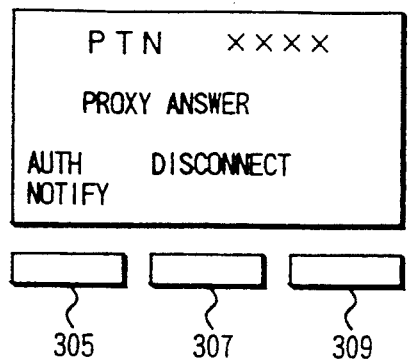
F I G. 2 3
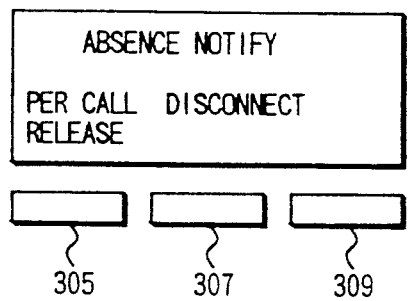
F I G. 2 4
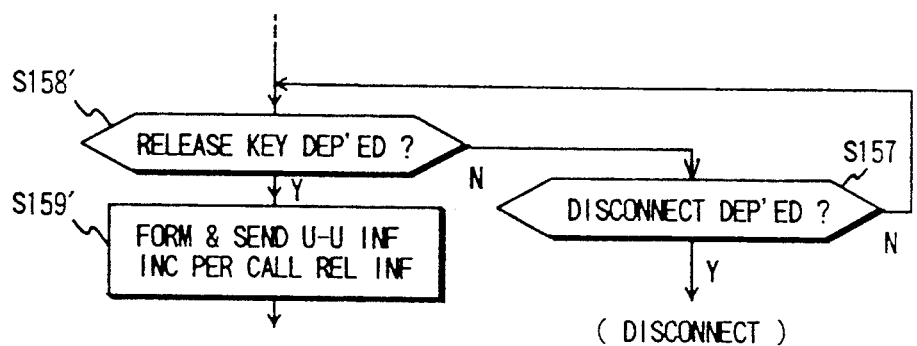
F I G. 2 5

PERSONAL COMMUNICATION SYSTEM

BACKGROUND OF THE INVENTION

The present invention relates to a personal communication system. Here, "personal communication" indicates such a telephone communication that a personal telecommunication number allocated to each person is used (without use of a telephone number allocated to each telephone set) to enable personal communications, no matter where the personal user himself may be.

In the personal communication, the call processing is effected on the basis of a personal telecommunication number (PTN) previously determined for each personal user. One of the major features of this personal communication is to enable telephone communications personally. In more detail, the call information transmitted and received between personal communication terminal units and a network includes PTNs for calling each person. When such a personal call as described above is incoming to the personal terminal unit, the personal terminal unit operates to answer the incoming personal call only when a person designated by the incoming PTN inputs his own personal identity (PID) to the personal terminal unit. In other words, it is possible to realize the personal communication such that only the called person designated by the PTN can communicate with the calling person, without allowing other persons to communicate with the calling person.

In the prior art personal communication system, however, there exits some problems in that the personal terminal unit to which a personal call is incoming is kept ringing, when the designated called person is absent as long as the calling person does not stop the personal call of his own free will. In addition, there exists some cases where the calling person wants to communicate with another person as a proxy.

SUMMARY OF THE INVENTION

With these problems in mind, therefore, it is the primary object of the present invention to provide a personal communication system by which, whenever a personal communication call is incoming in spite of the fact that the specific designated person is absent, it is possible to take the next best action such as ringing stop, an answer by a proxy, etc. according to the calling person's intention.

To achieve the above-mentioned object, the present invention provides a personal communication system in which a call is originated from a calling side terminal equipment using number information allocated to a called person and the call is processed on the called side terminal equipment as a personal call, the system comprising absence notifying means disposed on the called side terminal equipment, for sending absence notify information to the calling side terminal equipment when a predetermined absence notify request is entered during a processing of the personal call.

In the personal communication system according to the present invention, whenever a predetermined absence notify request is entered into the called side terminal equipment by its user in response to personal call incoming, the absence notify information is sent back from the called side terminal equipment to the calling side terminal equipment so that the calling person can recognize the absence of the called person.

BRIEF DESCRIPTION OF THE DRAWINGS

FIG. 6 is a block diagram showing the internal configuration of the embodiment;

FIG. 7 is a flowchart showing the processing procedure of the control section at the personal call incoming in this embodiment;

FIG. 15 is a diagram showing the communication sequence of when the called person himself answers the personal call incoming in the system shown in FIG. 1;

FIG. 23 is an illustration showing an example of display on the liquid crystal display on the calling person side terminal unit;

FIG. 24 is an illustration showing another example of display on the liquid crystal display on the calling person side terminal unit; and FIG. 25 is a flowchart showing the processing procedure of the control section of the calling person side terminal unit.

DETAILED DESCRIPTION OF THE PREFERRED EMBODIMENTS

Figure 1:
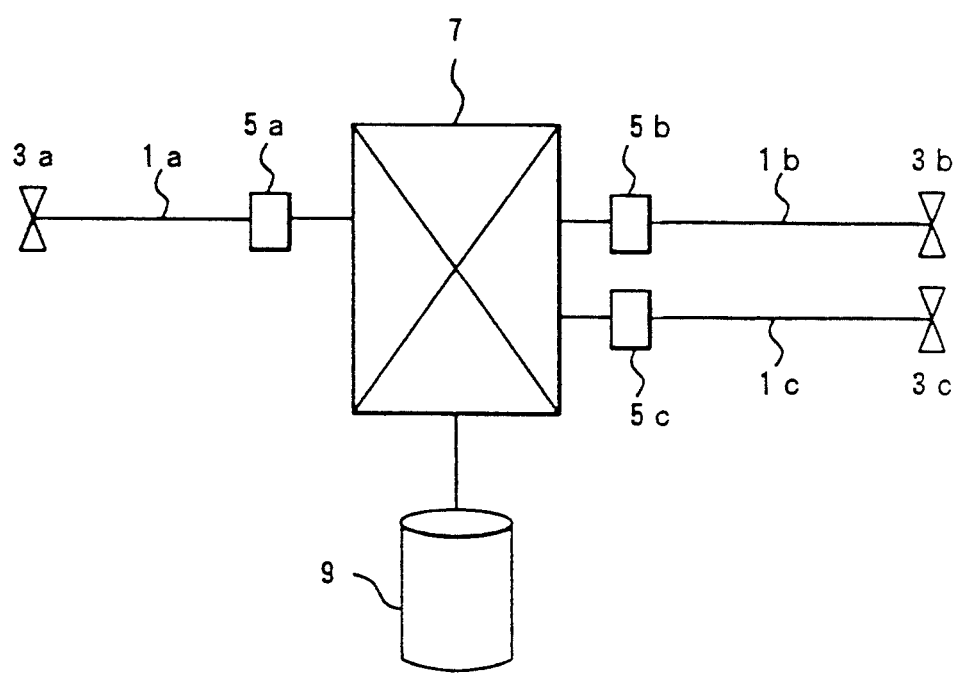
FIG. 1 is a block diagram showing a configuration of an integrated service digital network (ISDN) communication system in which an embodiment of the personal terminal units related to the present invention are incorporated.

An embodiment of the personal terminal unit according to the present invention will be described hereinbelow by taking the case where the subscriber's buses of the ISDN basic interface are used, with reference to FIG. 1. In the drawing, an example of the communication system including an embodiment of the personal terminal units according to the present invention is shown.

Figure 2:
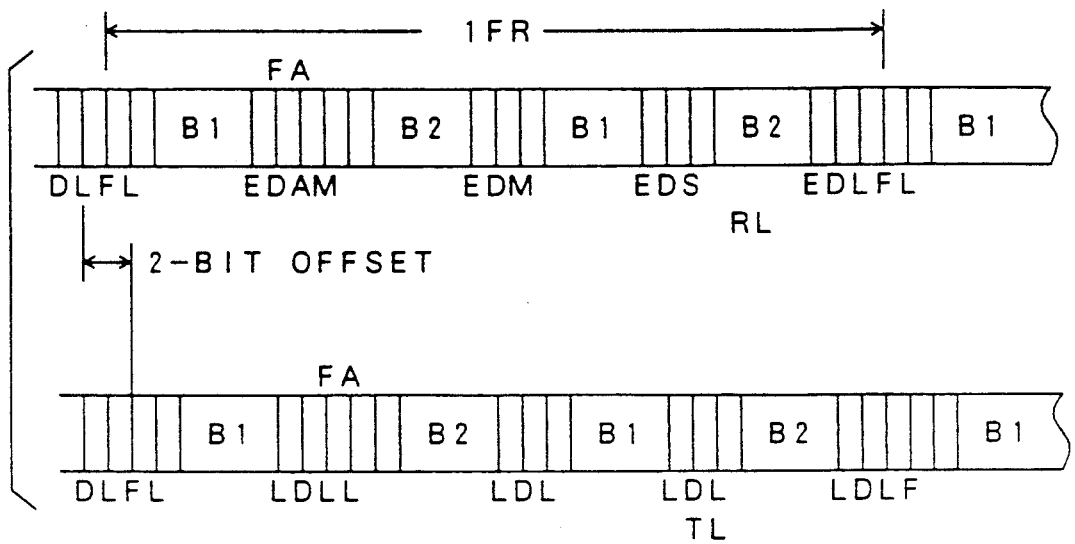
FIG. 2 is an illustration showing a format of the communication frames of R line and T line of the user's bus for an ISDN subscriber.

In FIG. 1, the terminal units 3a, 3b, and 3c of the present invention are connected to the subscriber's buses 1a, 1b and 1c of the ISDN, respectively. The buses 1a, 1b and 1c are connected to an ISDN exchange unit 7 via digital service units (DSU) 5a, 5b and 5c, respectively On the respective user's buses 1a, 1b and 1c, communications between the respective personal terminal units 3a, 3b and 3c and the exchange unit 7 are effected by use of communication frames including two time-division multiplexed 64 kbps information channels (B channel) and a 16 kbps signal channel (D channel). The respective buses 1a, 1b and 1c are composed of a reception bus line (R line) and a transmission bus line (T line), respectively. The construction of the communication frame of the R line is different from that of the T line, as shown in FIG. 2, respectively.

The ISDN exchange unit 7 is provided with a data base 9, in which the personal telecommunication numbers (PTNs) of the subscribers and the terminal unit numbers of the personal terminal units used by the subscribers (as each person's position information) in corresponding relationship between each PTN and each terminal unit number. When a call for personal communication (differentiated from station call) is originated from the personal terminal unit, a call setup message including a PTN indicative of a specific person required to communicate with is sent from the personal terminal unit to the exchange unit 7. In response to this setup message, the exchange unit 7 selects a terminal unit number corresponding to the sent PTN with reference to the data base 9, and sends the setup message to the personal terminal unit having the selected terminal unit number.

In the respective personal terminal units 3a, 3b and 3c, respective personal identity (PID) for the user is registered, respectively. Where a single personal terminal unit is used for a plurality of the users, a plurality of PIDs for the plural users are registered in the single personal terminal unit. In addition, in the embodiment of the present invention, user's name can be registered in the personal terminal unit in corresponding relationship between the user's name and the user's PID, respectively.

Figures 3, 4:
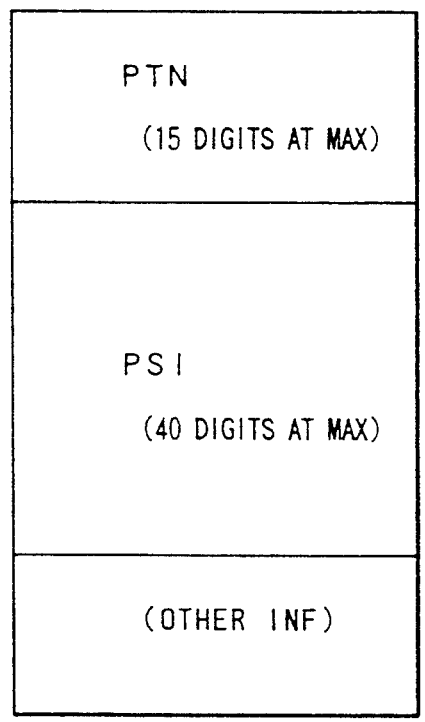
FIG. 3 is an illustration showing the construction of a personal identity (PID)
FIG. 4 is an illustration showing a memory map of a PID map.

Here, the PID consists of a personal telecommunication number (PTN), a personal secret identity (PSI), and a pass word, as shown in FIG. 3. The PTN is a number specific for each person, which is published in a telephone directory. Each person can have a plurality of the PTNs, if needed. On the other hand, although the PSI is also a number specific for each person, this PSI is not published. In other words, only the user himself and the system know this PSI, and each person can have only a single PSI. The number of digits of the PSI is preferably larger than that of the PTN. The digits of the PSI are 40 at the maximum, while the digits of the PTN are 15 at the maximum. These PTN and PSI are allocated to each person by the system. On the other hand, the pass word can be freely determined by each person, and not published. The number of the digits of the pass word is 4. This pass word is a number used to prevent both the PTN and PSI determined by the system from being used illegally by another person. However, there may exist the case where no pass word is used according to the user's will.

In the personal terminal unit in which the PID as described above is registered, when a call setup message comes in from the network, the personal terminal unit compares the PTN included in the incoming setup message with the PTN registered in the PID. If both PTNs match, the terminal unit determines that this incoming call is a call for personal communication (referred to as personal call to differentiate the station call), and displays the PTN and generates the specific ringing sound for notifying of the personal call incoming. Under these conditions, when the individual name is registered, it is also possible to display the person's name together with or instead of the PTN display. If both PTNs do not match, the incoming call is determined to be a station call, and the ordinary ringing sound is generated. In the above-mentioned ringing operation at the personal call incoming, when the person corresponding to the displayed PTN or name enters his/her own PID to the personal terminal unit, the personal terminal unit starts the processing for answering the incoming personal call.

When inputting the user's own PID to the personal terminal unit at the personal call incoming, the user can enter the PID through the dial keys of the personal terminal unit. However, since the number of digits of the PID is large, it is rather difficult for the user to remember the PID. In this embodiment, therefore, the PID can be entered also by use of a portable card. In more detail, the user carries a card in which the PTN and PSI are both recorded magnetically, for instance. When the user inserts this card into a card slot provided for the personal terminal unit, the PTN and PSI are both inputted to the personal terminal unit. Further, with respect to the pass word, it may be preferable to directly enter the pass word remembered by the user, without recording the pass word, under consideration of the user's secrecy and voluntariness. Since this portable card serves as a key to open the lock of the personal terminal unit in answering the personal call incoming, this card is referred to as a PID key, hereinafter.

Figure 5:
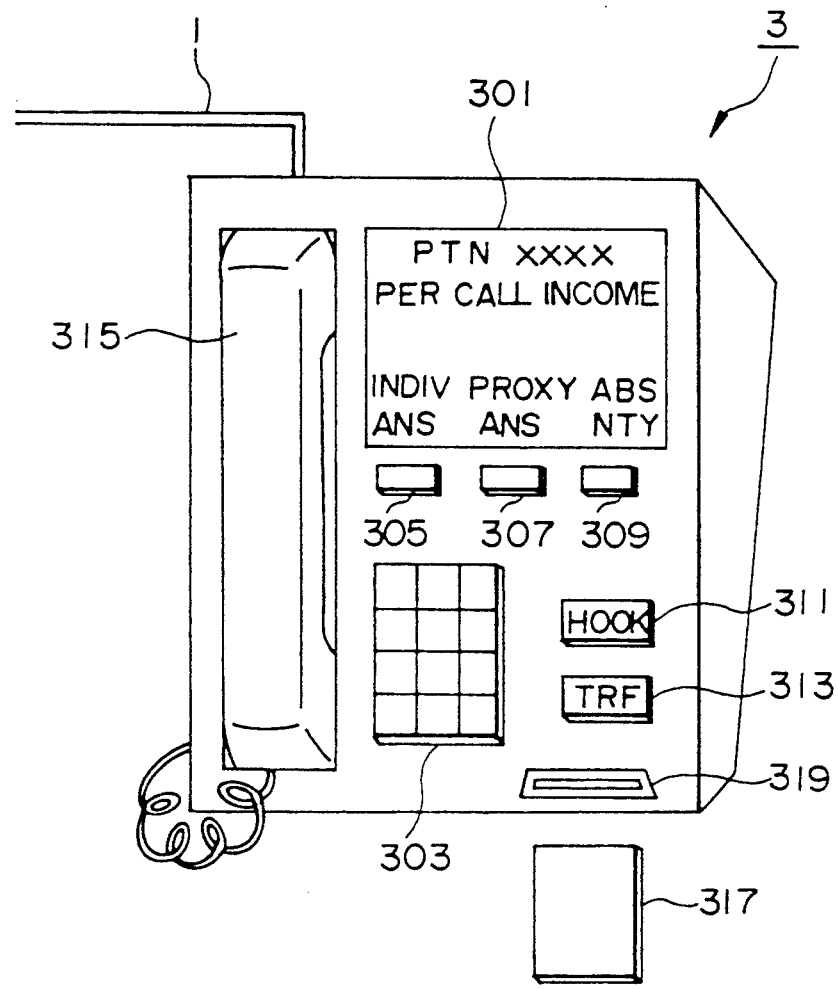
FIG. 5 is a perspective view showing the outside of an embodiment of the personal terminal unit related to the present invention.

The personal terminal units 3a, 3b and 3c will be described in more detail hereinbelow. The respective personal terminal units 3a, 3b and 3c are the same in structure and therefore designated by the same reference number 3, hereinafter. FIG. 5 shows the external view thereof.

As shown in FIG. 5, the personal terminal unit 3 is provided with a liquid crystal display unit (LCD) 301, a dial key matrix 303, various function keys 305, 307, 309, 311, 313, and a handset 315 on the front panel thereof. The liquid crystal display 301 displays the aforementioned PTN or name at the personal call incoming and the kind of call incoming (i.e., personal call or station call). FIG. 5 shows an example of display at the personal call incoming. The functions of three function keys 305, 307 and 309 disposed below the liquid crystal display 301 are displayed on the display 301. That is, the key 305 is an individual answer key, the key 307 is a proxy answer key, and the key 309 is an absence key. Further, function keys located below and to the right side of the liquid crystal display 301 are a hook key 311 and a transfer key 313. In addition, a slot 319 through which a personal portable card (PID key) 317 is inserted is provided on the front panel, as shown in FIG. 5.

FIG. 6 shows an internal configuration of the personal terminal unit 3. As shown, a B channel switch 323 and a control section 331 are connected to the user's bus 1 of the ISDN via a network interface section 321. In the network interface section 321, each channel is separated from the communication frame received through the R line of the user's bus 1. Data of the two B channels (B1 and B2 channels) are transmitted to the B channel switch 323 and data of the D channel are transmitted to the control section 331. In contrast with this, the B channel data received from the B channel switch 323 and the D channel data received from the control section 331 are time-division multiplexed and assembled into a communication frame, and then sent to the T line of the user's bus 1. Further, PCM coded speech data are transmitted mainly through the B channel, and ISDN control data are transmitted mainly through the D channel. These control data related to the present invention are a call setup message, a call proceeding message, a ringing message, an answer message, an answer acknowledge message, a disconnect message, a release message, a release complete message, a user-user information, an information service data, etc.

A speech circuit 327 is connected to the B channel switch 323 via a PCM codec 325. The B channel switch 323 selects one of the B1 and B2 channels from the network interface section 321 and connects the selected one to the PCM codec 325. The PCM codec 325 converts the PCM speech data from the B channel switch 323 into analog communication signals and transmits these converted signals to the speech circuit 327. In contrast, the PCM codec 325 converts the speech signals from the speech circuit 327 into the PCM coded signals and then transmits these converted signals to the B channel switch 323.

A speech synthesis circuit 333, a handset 315 and a speaker 329 are additionally connected to the speech circuit 327. In this speech circuit 327, speech signal transmitting routes among the PCM codec 325, the speech synthesis circuit 333, the handset 315, and the speaker 329 are switched, respectively. Further, a switch 336 is interposed between the speaker 329 and the speech circuit 327, so that the speaker 329 is connected to the speech circuit 327 under control of the control section 331. Further, although not shown, a tone generator for generating various tones are incorporated in the speech synthesis circuit 333.

The control section 331 is a microcomputer mainly composed of a microprocessor and memory units, which controls the afore-mentioned data transmission and reception to and from the network interface section 321, and various operations of the personal terminal units. An input section 335 and a PID interface section 341 are connected to the control section 331, as inputting means. Here, the key input section 335 represents in practice the dial key matrix 303, and the various function keys 305, 307, 309, 311, 313 and 319. A PID interface section 341 reads the personal information such as the PTN and PSI from the PID key 317 inserted into the slot 319, and sends this information to the control section 331. In addition, the control section 331 is connected to the data base section 337 in which user's PIDs and names are registered as already described.

FIGS. 7 to 13 show, processing flowcharts of the control section 331 for an incoming personal call.

Figure 14:
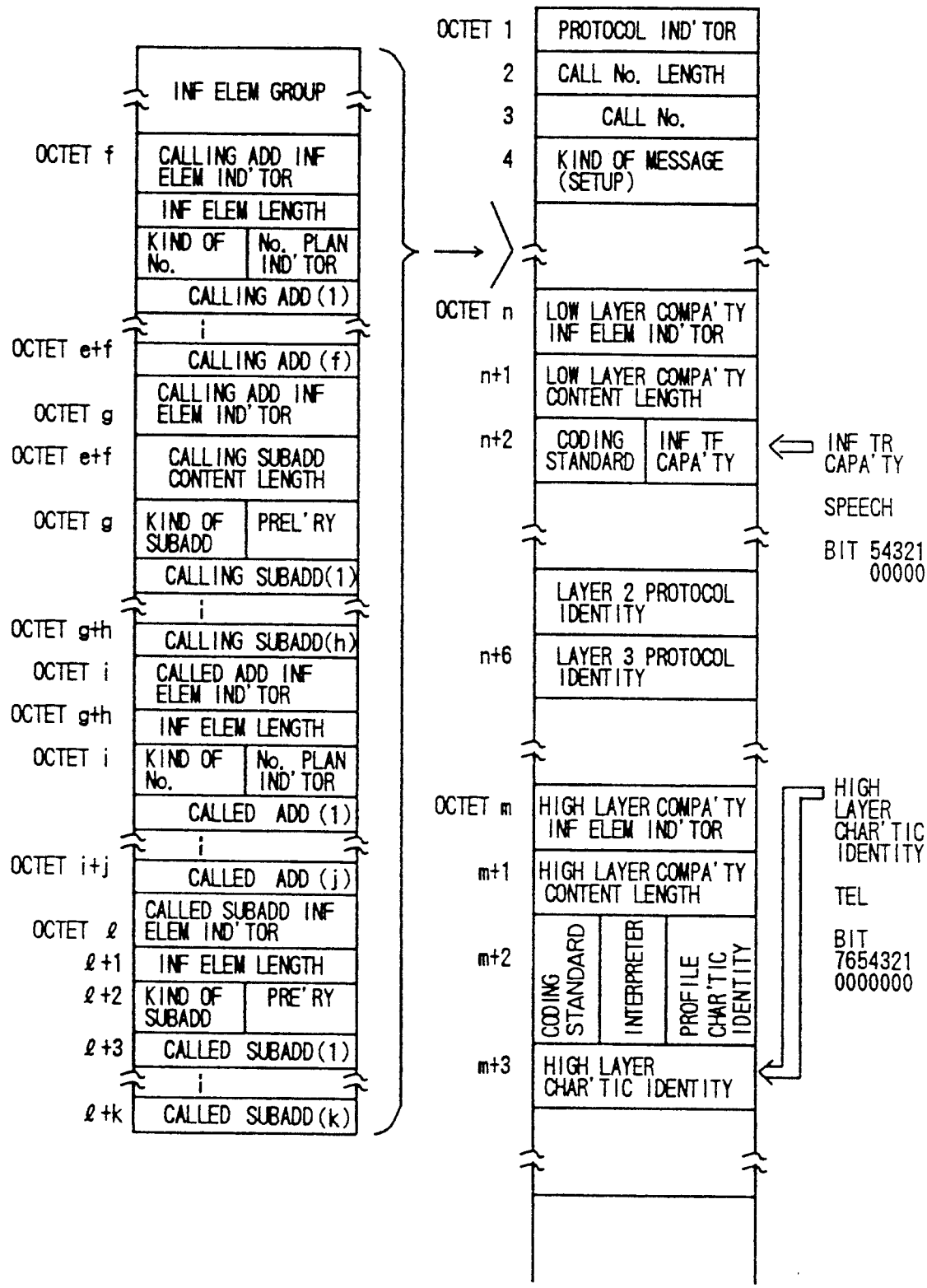
FIG. 14 is a format showing the setup message of the ISDN.

As already described, at a personal call incoming, a call setup message comes from the calling person side terminal unit via the D channel of the user's bus 1. With reference to FIG. 7, upon receiving the setup message, the control section 331 stores various data included in the received message (S1, S2). The setup message has a format as shown in FIG. 14, in which a PTN is included in the called address information elements. Thereafter, the control section 331 reads the previously registered PTNs from the data base section 337, and compares these with a PTN in the setup message (S3 to S5). If any one of the previously registered PTNs matches the PTN in the setup message, the control section 331 forms a call proceeding message and sends it to the user's bus 1 via the network interface section 321 (S6). Thereafter, the control section 331 forms a ringing message, sends the formed message to the user's bus 1 in the same way (S7), starts the timer T1 (S8), and enters the personal call incoming display (S9).

Figure 8:
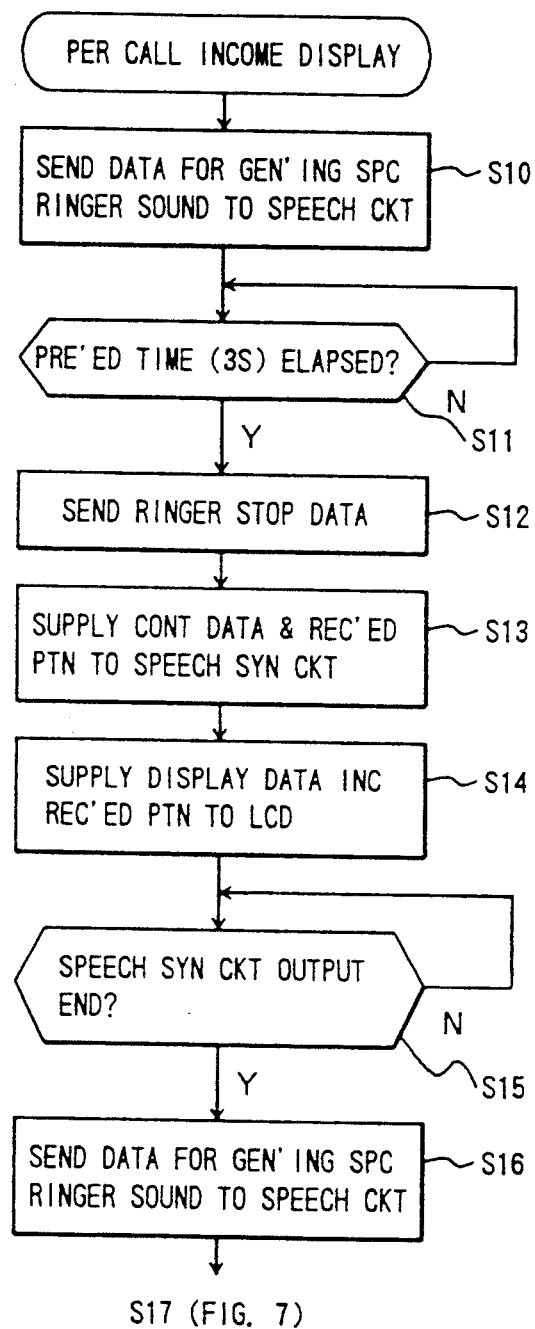
FIG. 8 is a flowchart showing the processing procedure for the personal call incoming display shown in FIG. 7.
Figure 9:
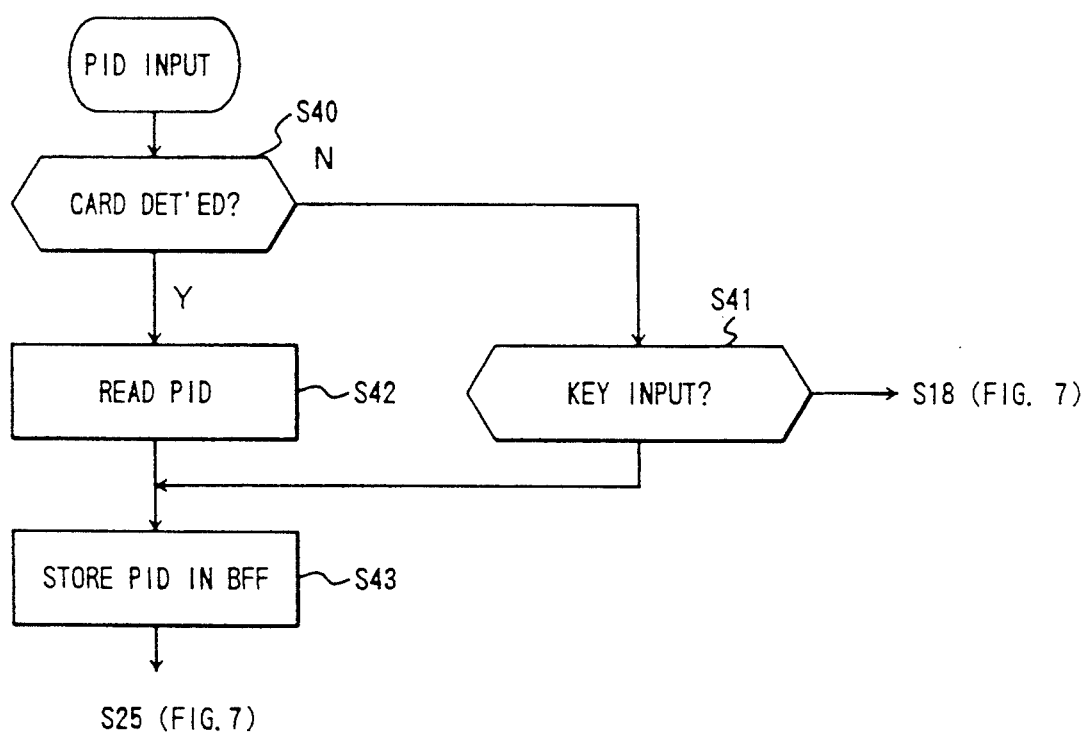
FIG. 9 is a flowchart showing the processing procedure for the PID input shown in FIG. 7.

As shown in FIG. 8, in the process of the personal call incoming display (S9), the control section 331 activates the speech synthesis circuit 333, so that previously prepared sound generating data for generating a specific ringer sound for personal call incoming is transmitted to the speech circuit 327 to output a specific ringer sound through the speaker 329 (S10). In this state, the switch 336 is closed, so that the specific ringer sound can be output. After the specific ringer sound is output for 3 sec, the control section 331 transmits a ringer stop data to the speech synthesis circuit 333 to stop the ringer sound (S11, S12). Thereafter, the control section 331 transmits the received PTN and the control data to the speech synthesis circuit 333. Therefore, a speech guidance such as "PTN xxxx is called. Please answer by depressing personal answer key, absence notify key, proxy answer key, or transfer key", in which "xxxx" indicates the received PTN, is output from the speech synthesis circuit 333 to the speaker 329 via the speech circuit 327 and the switch 336 (S13). In parallel, the control section 331 transmits the display data including the received PTN to the liquid crystal display, 301 to display a character message as shown in FIG. 5 on the liquid crystal display 301. Upon the end of the output of the speech guidance, the control section 331 controls the speech synthesis circuit 333 to generate the specific ringer sound again (S15, S16).

While the character message is being displayed on the LCD 301, as shown in FIG. 7, the control section 331 checks whether a PID is inputted (S17) and whether the transfer key 313, the absence notify key 309 or the proxy answer key 307 is depressed (S18 to S20). Under the condition that no PID is inputted, control enters a transfer notify mode when the transfer key 313 is depressed, an absence notify mode when the absence notify key 309 is depressed, and a proxy answer mode #2 when the proxy answer key 307 is depressed, respectively (S21, S22, S23). On the other hand, if a predetermined time t1 has elapsed under the condition that no PID is inputted and no key is depressed, the control enters the absence notify mode in the same way as when the absence notify key 309 is depressed (S24). Or else, in this case, control enters the disconnect processing (a disconnect message is sent to the user's bus, and the communication is ended).

While the character message is being displayed, if a person corresponding to the displayed PTN is near the terminal unit, the person may input his own PID in the manner as already described in order to answer the personal call incoming. In this case, the fact whether the PID is inputted or not is checked in practice by discrimination processing (S17) shown in FIG. 9. In more detail, the control section 331 checks whether a PID key (card) 317 is inserted (S40) and whether a PID is inputted through the dial key matrix 303 (S41). When a PID key 317 is inserted, the PID is read from the PID key 317 (S42), and then stored in the buffer area in the control section 331. Further, when a PID is inputted through the dial key matrix 303, the inputted PID is also stored in the buffer area (S43).

With reference to FIG. 7 again, when the input of the PID is acknowledged (S17), the control section 331 checks whether there exists an input error (S25). If an error exists, an error message is displayed on the liquid crystal display 301 to request a further input of another PID (S26). When a predetermined time t1 has elapsed without further input of a correct PID (S17), the control section 331 enters an absence notify mode (S22). On the other hand, when there exists no error in the input of the PID, the inputted PID is compared with the registered PID corresponding to the received PTN (S28). If both do not match, the control section 331 enters a proxy answer mode #1 (described later) (S29). If both match, the control section 331 blinks a display of "Individual Answer" on the liquid crystal display 301 (see FIG. 5) to demand the depression of the individual answer key 305 (S30), and further clears the timer T1 and starts the timer T2 (S31).

Thereafter, the control section 331 checks whether the individual answer key 305 is depressed (S32). If depressed, the control section 331 stops the personal call incoming display (S33) and forms and sends an answer message to the user's bus 1 (S34). Thereafter, if an answer acknowledge message is received from the user's bus 1 (S35), the control section 331 enters the speech processing to allow the start of speech using the handset 315 (S36). On the other hand, if a predetermined time t2 has elapsed without depression of the individual answer key 305 (S37), the control section 331 clears the timer T2 (S38) and proceeds to the step S33. In this case, the control section 331 keeps the switch 336 closed to maintain the speaker speech until the handset speech begins. On the other hand, the processing procedure of the control section 331 shown in FIG. 7 may be modified in such a way that, if the individual answer key 305 is not depressed within the time t2, the control section 331 proceeds to the step S38 and to the proxy answer mode #2 as shown FIG. 7.

Further, FIG. 15 shows the communication sequence of the control data between the calling person side terminal unit and the network (exchange unit) and between the network and the called person side terminal unit from the personal call incoming to the speech start as described above, together with the control sequence until the speech end.

The feature of the present invention is to enable another person to answer the personal call when the person himself is absent. To realize the above-mentioned answer, the present invention provides a few methods such as a proxy answer by another person, a notice of the called person's absence to the calling person by depressing the absence notify key, and a transfer of the personal call incoming to another terminal unit in the place where the called person is.

First, the proxy answer will be described hereinbelow. There are two methods as follows: The first method is to input a PID by another person in the same way as the called person. In this case, as already explained with reference to FIG. 7, since the compared results of the PID indicates mismatch in step S28, the control section 331 enters the proxy answer mode #1. The second method is to directly depress the proxy answer key 307. In this case, the control section 331 enters the proxy answer mode #2 of the step S23, as shown in FIG. 7.

Figure 10:
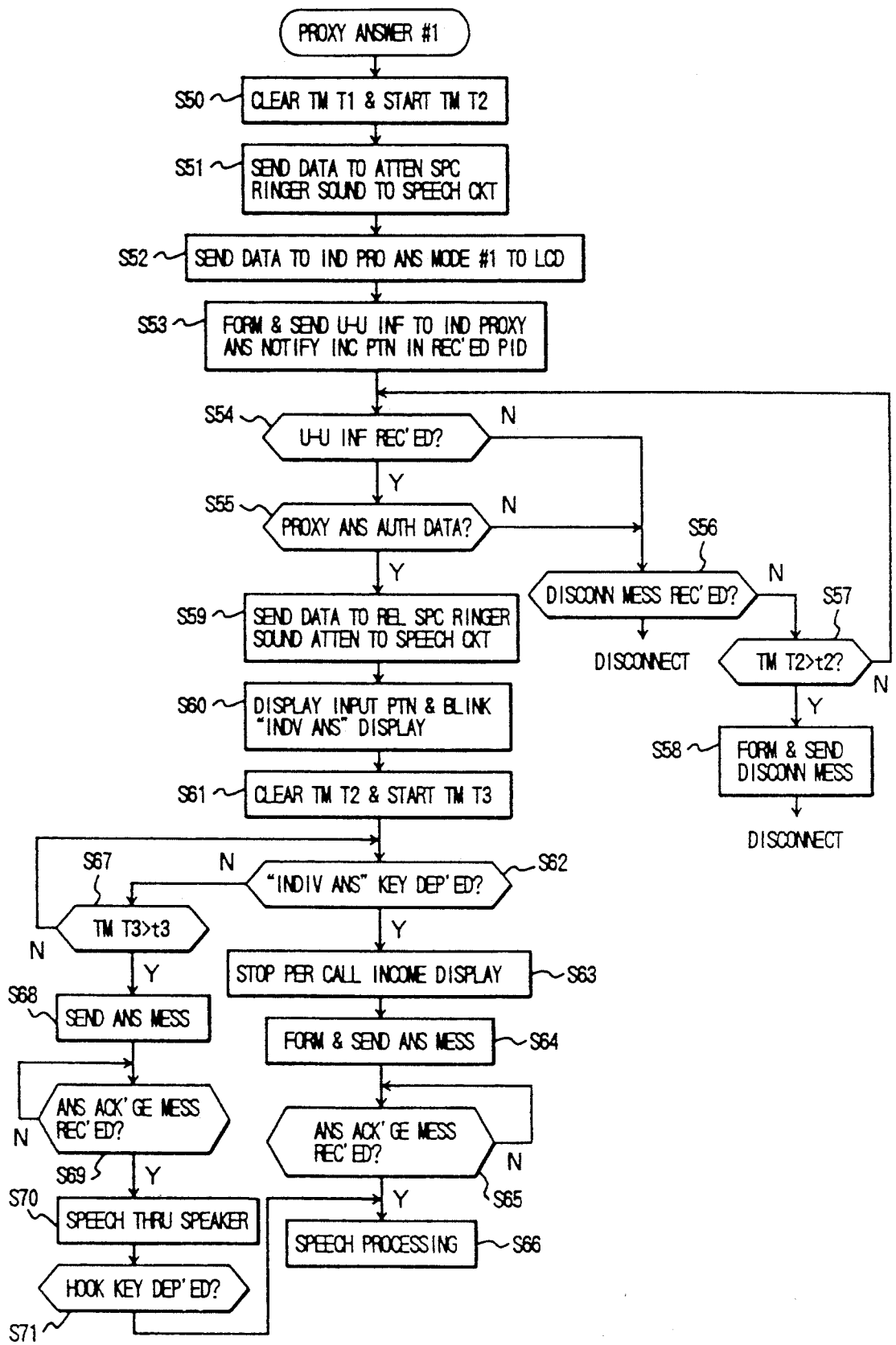
FIG. 10 is a flowchart showing the processing procedure for the proxy answer mode #1 shown in FIG. 7.
Figure 16:
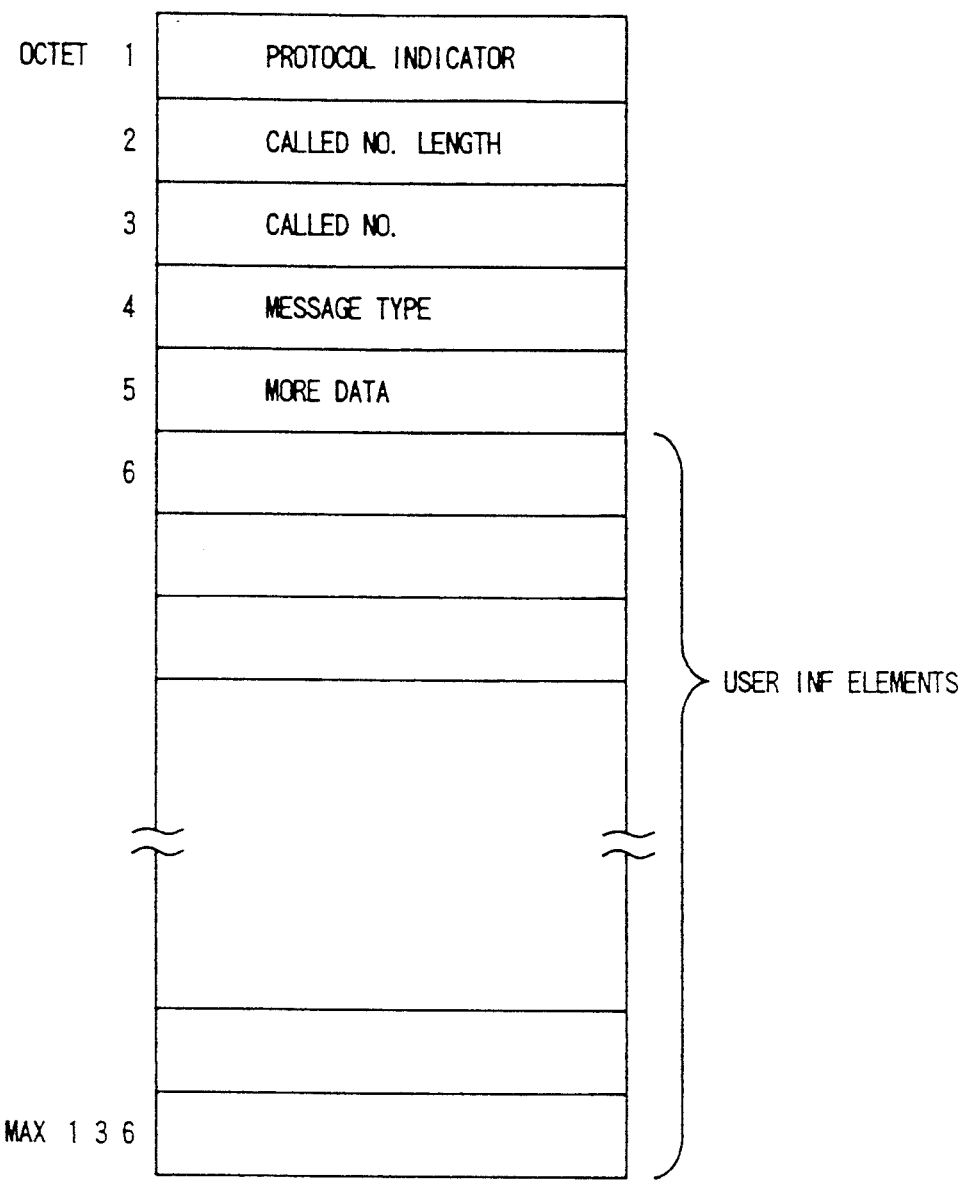
FIG. 16 is an illustration showing a format of user-user information of the ISDN.

FIG. 10 shows the processing flow of the control section 331 in the proxy answer mode #1. When entering the proxy answer mode #1, the control section 331 first clears the timer T1 and starts the timer T2 (S50), sends the control data for attenuating the sound volume of the specific ringer sound to the speech circuit 327 (S51), and supplies the display data for indicating the proxy answer mode #1 to the liquid crystal display 301 (S52). Further, the control section 331 forms the user-user information indicative of the proxy answer including the PTN of the inputted proxy answerer's PID and sends the formed information to the user's bus 1 (S53). FIG. 16 shows a format of this user-user information. Therefore, the information indicative of proxy answer and the name or PTN data of the proxy answerer is to be written in accordance with the previously determined coding rules into the user-user information element group of this format. In this case, if only the PTN data are registered in the data base section 337, the PTN data is written in the user-user information under the control of the control section 331. If the name data corresponding to the PTN data are registered, the name data is written therein. Further, it is possible to write both the PTN and name data in the user-user information.

Figure 17:
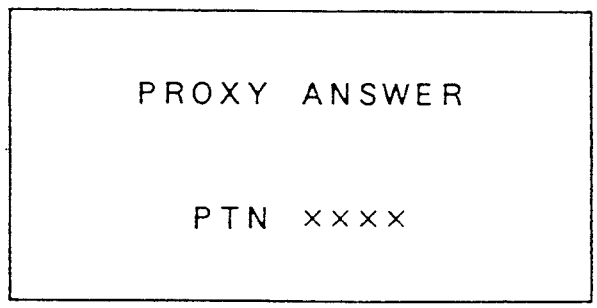
FIG. 17 is an illustration showing an example of a character message displayed on the calling person side terminal unit in the proxy answer mode #1.

This user-user information is sent to the calling person side terminal unit via the exchange unit 7. In the calling person side terminal unit, the control section 331 decodes the sent user-user information and displays the character message indicative of proxy answer and the PTN of the proxy answerer on the liquid crystal display 301 as shown in FIG. 17. At the same time, a speech guidance such as "Would you prefer proxy answer by person of PTN xxxxx", in which "xxxxx" indicates the PTN of the proxy answerer, is formed by the speech synthesis circuit 333 and outputted through the speaker 329. It is also possible to form this speech guidance by the exchange unit 7 (without forming this by the calling person side terminal unit) and to send this to the calling person side terminal unit via the B channel. Once this proxy answer is displayed, the calling person is demanded to input an intention of authorization or non-authorization of the proxy answer through the keys in accordance with a predetermined way. This authorization or non-authorization information is formed as the user-user information, and sent from the calling person side terminal unit to the called person side terminal unit via the exchange unit 7. Further, it is possible for the calling person to return the handset to the on-hook status to end the communication in the case of the non-authorization. In this case, a disconnect message is sent to the called person side terminal unit via the exchange unit 7.

Figure 22:
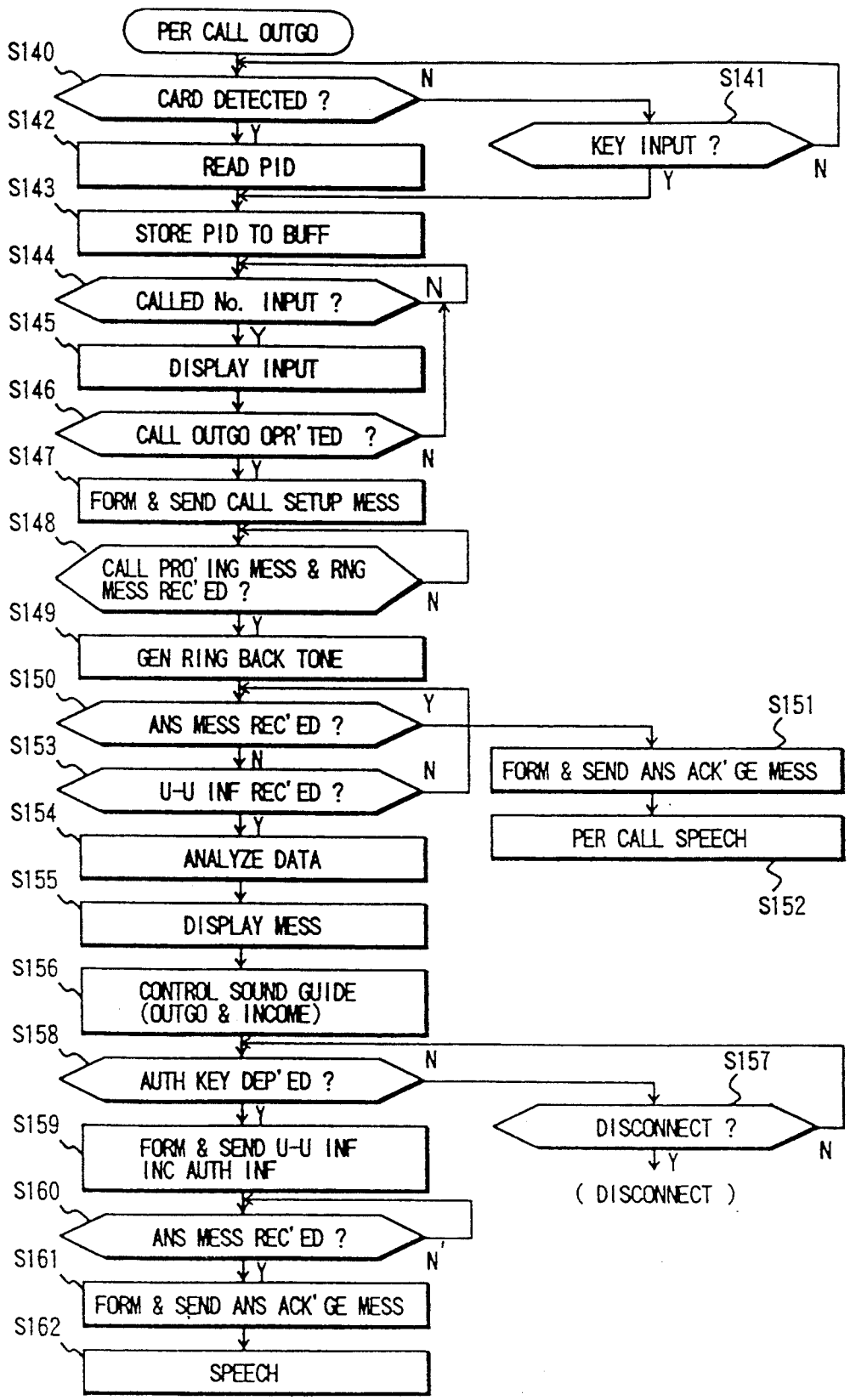
FIG. 22 is a flowchart showing the processing procedure of the control section of the calling person side terminal unit.

The processing flow of the control section 331 of the calling person side terminal unit will be described hereinbelow with reference to FIG. 22.

First, the control section 331 checks whether a PID key (card) 317 is inserted (S140) or a PID is inputted through the dial key matrix 303 (S141). When a PID key 317 is inserted, the PID is read from the PID key 317 (S142) and stored in the buffer area of the control section 331 (S143). On the other hand, when a PID is inputted through the dial key matrix 303 (S141), the inputted PID is also stored in the buffer area (S143).

Upon acknowledge of the PID input, the control section 331 enters the processing for personal call originating, and standbys the input of a PTN of the called person side. When the dial key matrix 303 is depressed to enter a called person's PTN (S144), the control section 331 displays the inputted PTN data on the liquid crystal display 301 (S145). Further, when the call originating operation (depressing of the hook key 311 or taking up of the handset 315) is performed (S146), the control section 331 forms the call setup message and sends the setup message to the user's bus 1 (S147). In the setup message, the PTN data from the buffer area is included in the called address information element. As described above, the personal call is originated.

Further, in this embodiment, although the personal call originating is enabled when the calling person inputs his own PID, it is also possible by using a specific function key for personal call originating on the terminal unit. In this case, the personal call originating is performed by inputting a PID of a called person and the depressing this function key, without inputting calling person's PID.

After the call setup message has been sent, upon reception of the call proceeding message and the ringing message (S148), the control section 331 sends the control data for generating ring back tone (RBT) to the speech synthesis circuit 333, and the ring back tone is outputted from the speaker 329 via the speech circuit 327 and the switch 336 (S149). Under these conditions, upon the reception of the answer message (S150), the control section 331 determines that the personal speech is enabled, and forms and sends the answer acknowledge message (S151), proceeding to the personal call speech (S152). At the same time, the control section 331 sends the control data for stopping the ring back tone to the speech synthesis circuit 333.

Upon reception of the answer message instead of the user-user information (S153), the control section 331 detects the data indicative of the proxy answer and the PTN data indicative of proxy name or PTN from the user-user information. Upon reception of both the data (S154), the control section 331 displays the received proxy name or PTN data on the liquid crystal display 301 (S155), and sends these data to the speech synthesis circuit to generate the above-mentioned speech guidance (S156). In this case, the control section 331 displays the indication as shown in FIG. 23 on the liquid crystal display 301, in which the function key 305 is allocated as an authorization key and the function key 307 is allocated as a disconnect key. When this function key 307 is depressed (S159), the control section 331 forms and sends the disconnect message to execute the disconnect processing. When the function key 305 is depressed (S158), the control section 331 forms the user-user information including the authorization message and sends the formed message to the user's bus 1 (S159). Thereafter, upon reception of the answer message (S160), the control section 331 forms the answer acknowledge message, sends this message to the user's bus 1 (S161), and proceeds to the speech status within the control section 331 (S162).

With reference to FIG. 10 again, upon reception of the user-user information from the calling person side terminal unit (S54), the control section 331 of the called person side terminal unit checks whether the proxy answer authorization data is included in the user-user information (S55). On the other hand, upon reception of the disconnect message (S56), the control section 331 enters the disconnect processing. When no answer is made from the calling person side terminal unit after a predetermined time t2 has elapsed (S57), the control section 331 forms the disconnect message, sends the formed message to the user's bus 1 (S58), and enters the disconnect processing.

When there exists an authorization data in the user-user information as the result of the checking operation in step S55, the control section 331 releases the attenuation of the specific ringer sound to return the sound volume to the normal status (S59), displays the inputted PTN of the proxy answerer on the liquid crystal display 301, and blinks the display of "Individual Answer" to demand the depression of the individual answer key 305 (S60). Further, the control section 331 clears the timer T2 and starts the timer T3 (S61). Thereafter, if the individual answer key 305 is depressed (S62), the control section 331 stops the display of the personal call incoming (S63), forms the answer message, and sends the formed message to the user's bus 1 (S64). Subsequently, when the answer acknowledge message is received from the user's bus 1 (S65), the control section 331 enters the speech processing. On the other hand, when the individual answer key 305 is not depressed after the predetermined time period t3 has elapsed after the step S61 (S67), the control section 331 sends the answer message to the user's bus 1 (S68). Thereafter, upon reception of the answer acknowledge message (S69), the control section 331 enters the speaker speech (speech signals from the calling person are outputted through the speaker 329) by keeping the switch 336 closed (S70). Thereafter, if the hook key 311 is depressed (S71), the control section 331 opens the switch 336 and enters the speech processing (handset speech) (S66).

Figure 18:
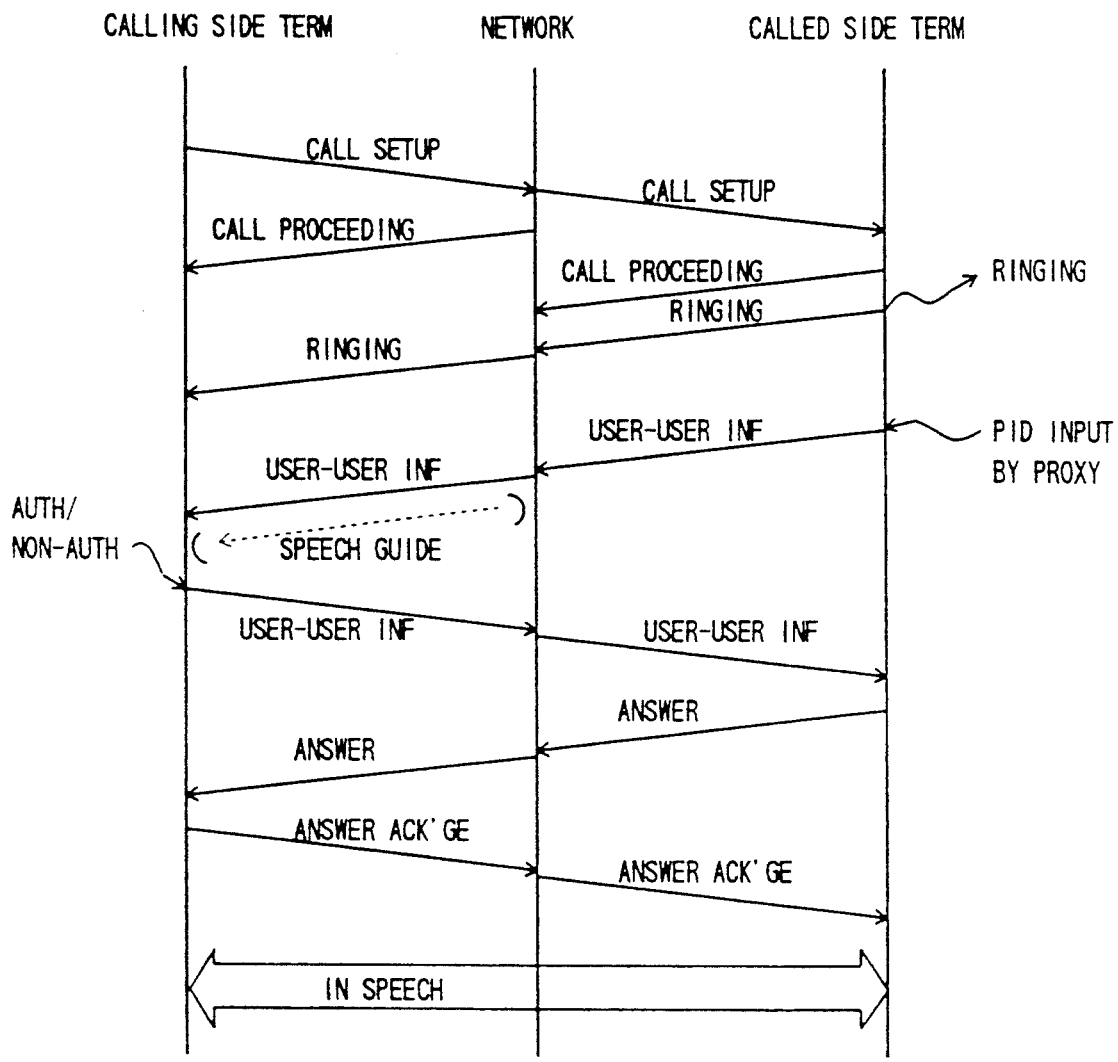
FIG. 18 is a diagram showing a communication sequence of when the proxy answer mode #1 is effected in the system shown in FIG. 1.

As described above, in the proxy answer mode #1, the proxy answerer can communicate with the calling person on condition that the calling person authorizes the proxy answer. FIG. 18 shows the communication sequence of the control data between the calling person side terminal unit and the network (exchange unit) and between the network and the called person side terminal unit in the proxy answer mode #1.

Figure 11:
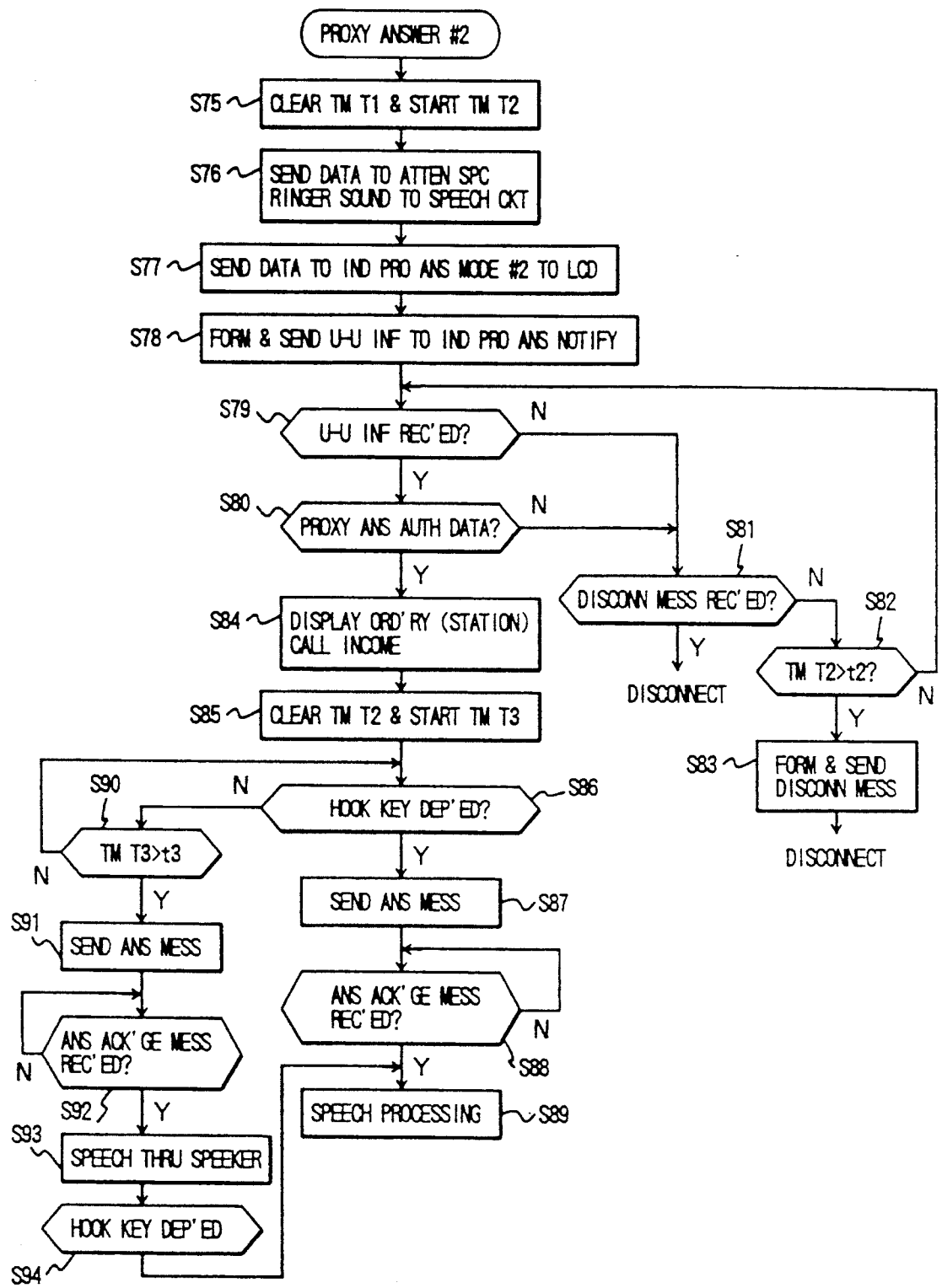
FIG. 11 is a flowchart showing the processing procedure for the proxy answer mode #2 shown in FIG. 7.

The proxy answer mode #2 will be described hereinbelow. This mode is started when the proxy answer key 307 is depressed during ringing operation in the same way as already described. FIG. 11 shows the processing flowchart of this mode.

In this proxy answer mode #2, the points different from the proxy answer mode #1 are that the character data indicative of the proxy answer mode #2 is displayed on the liquid crystal display 301 in the step S77 and that the proxy answer information which does not specify the proxy answerer is sent in the step S78 to the calling person side terminal unit as the user-user information. In this mode, since the character message from which the PTN is removed as shown in FIG. 17 is displayed by the calling person side terminal unit, the calling person inputs his intention of authorization or non-authorization in response to this display.

In the called person side terminal unit, when the user-user information indicative of proxy answer authorization is received from the calling person side terminal unit (S79, S80), the ordinary call incoming display (i.e., making the ordinary ringer sound and displaying the character message indicating the station call) is performed (S84). In other words, the control section 331 sends a control signal for generating the ordinary ringer sound to the speech synthesis circuit 333 to notify of the ordinary call incoming. When the hook key 311 is depressed during this alerting (S86), the control section 331 forms the answer message and sends the formed message to the user's bus 1 (S87). Thereafter, the processing is the same as the proxy answer mode #1.

The operation of the calling person side terminal unit in the proxy answer mode #2 is roughly the same as the proxy answer mode #1. The points different from the proxy answer mode #1 are that the data analyzed in the step S154 shown in FIG. 22 includes only the data indicative of the proxy answer, and that message display and the speech guidance in the steps S155 and S150 indicate only the possibility of the proxy answer.

The absence notify mode will be described hereinbelow with reference to FIG. 12. This mode is started when the absence notify key 309 is depressed during the alerting as already described.

Figure 12:
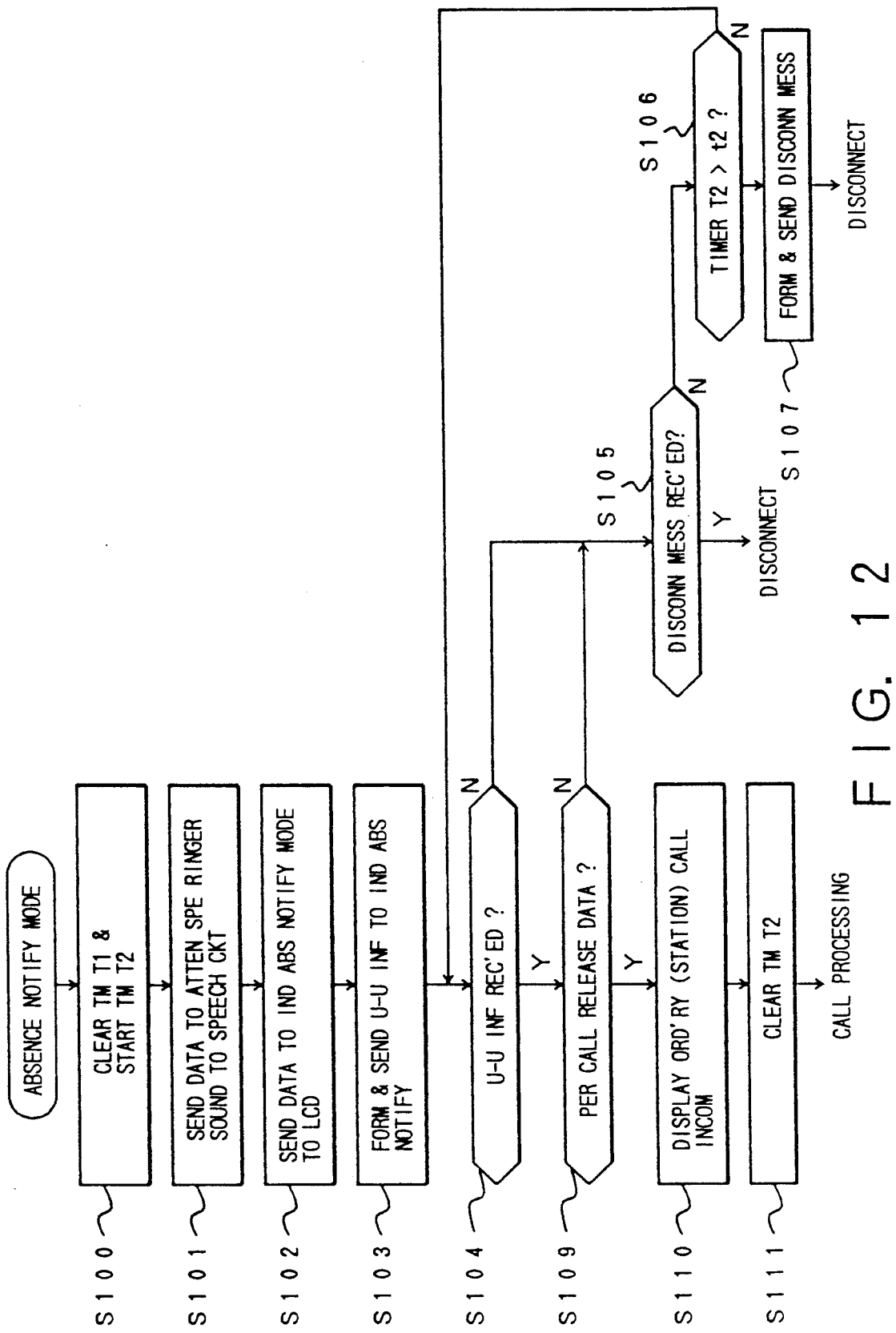
FIG. 12 is a flowchart showing the processing procedure for the absence notify mode shown in FIG. 7.
Figure 19:
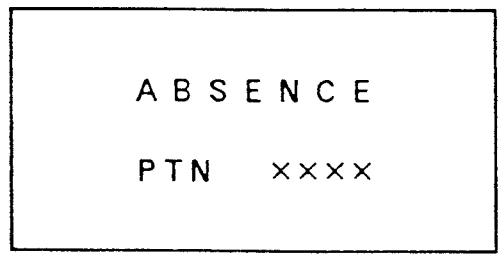
FIG. 19 is an illustration showing an example of a character message displayed on the calling person side terminal unit in the absence notify mode.

In the processing of the absence notify mode shown in FIG. 12, the points different from the proxy answer mode are that the character message indicative of the absence notify mode is displayed on the liquid crystal display 301 in the step S102, and that the information indicative of the absence notify is sent to the calling person side terminal unit as the user-user information in the step S103. In this mode, the character message indicative of the absence of the called person as shown in FIG. 19 is displayed in the calling person side terminal unit. At this moment, it is also possible to output the speech guidance simultaneously in the same way as in the proxy answer mode. If the calling person intends to release the personal call, the calling person inputs his intention through the keys in accordance with a predetermined method. The inputted personal call release information is sent to the called person side terminal unit as the user-user information. However, if the calling person has no intention to release the personal call, the calling person returns the calling person side terminal unit to the on-hook condition, so that the disconnect message is sent to the called person side terminal unit.

In the called person side terminal unit, upon reception of the user-user information indicative of the personal call release sent from the calling person side terminal unit (S104, S109), the control section 331 starts the ordinary call incoming display (S110), and thereafter enters the call processing in the same way as in the proxy answer mode #2.

Figures 20, 21:
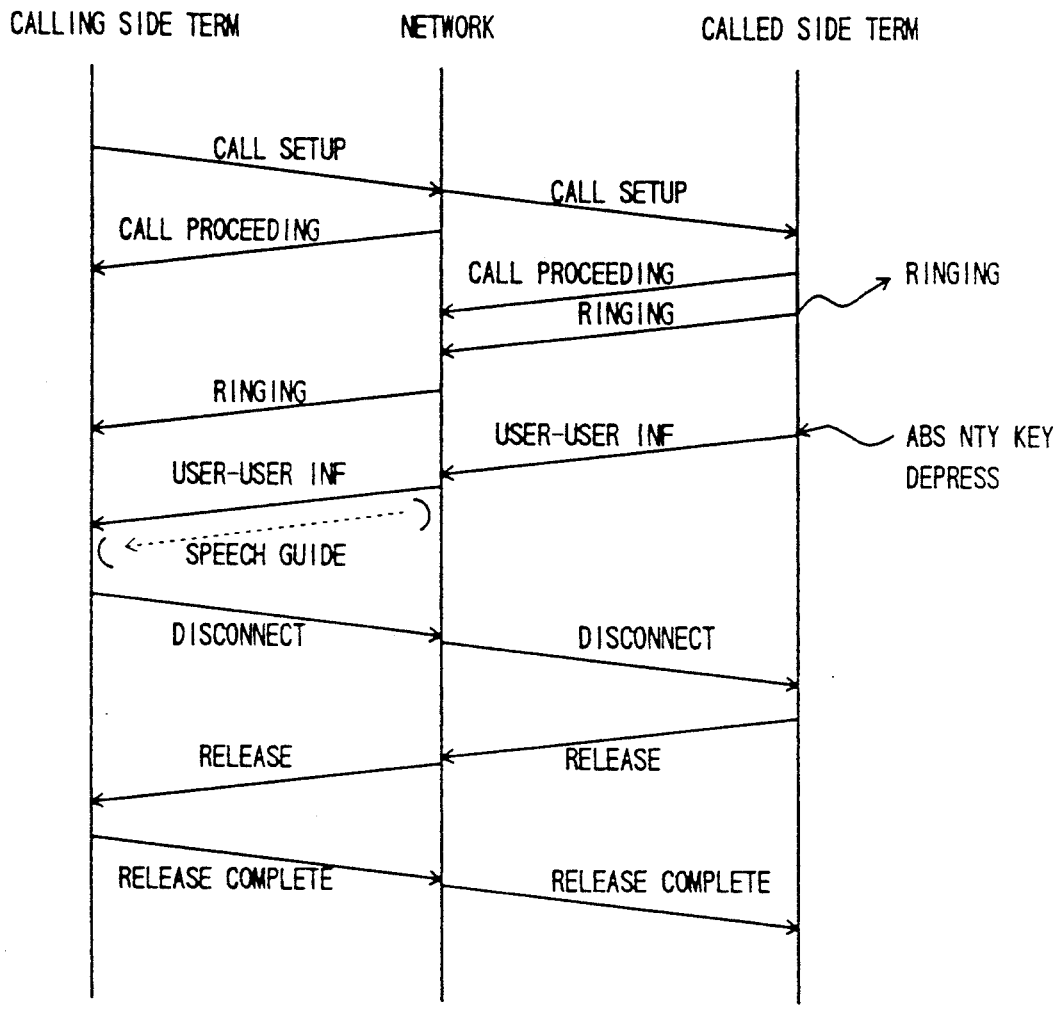
FIG. 20 is a diagram showing a communication sequence of when the absence notify mode is effected in the system shown in FIG. 1.
FIG. 21 is an illustration showing an example of character message displayed on the calling person side terminal unit in the transfer notify mode.

As described above, in the case of the absence notify mode, the absence of the called person himself is notified to the calling person himself, and only when the calling person releases the personal call, it is possible for another person to communicate with the calling person. Further, since the calling person knows the absence of the called person, the calling person can immediately stop the personal call origination. FIG. 20 shows the communication sequence when the personal call origination is stopped.

The operation of the calling person side terminal unit is roughly the same as in the proxy answer mode #2. The points different from the proxy answer mode #2 are that the data analyzed in the step S154 shown in FIG. 22 is the data indicative of the absence notify, and that the message display and the speech guidance in the steps S155 and S156 are those indicative of absence notify. Further, in this mode, the function key 305 is allocated to the personal call release key, and the function key 307 is allocated to the disconnect key, as shown in FIG. 24. Therefore, when the function key 305 is depressed in FIG. 25 (S158'), the control section 331 forms the user-user information including data indicative of personal call release and sends the formed data to the user's bus 1 (S159').

The transfer notify mode will be described hereinbelow with reference to FIG. 13. This mode is started when the transfer key 313 is depressed during the ringing operation, as described already.

Figure 13:
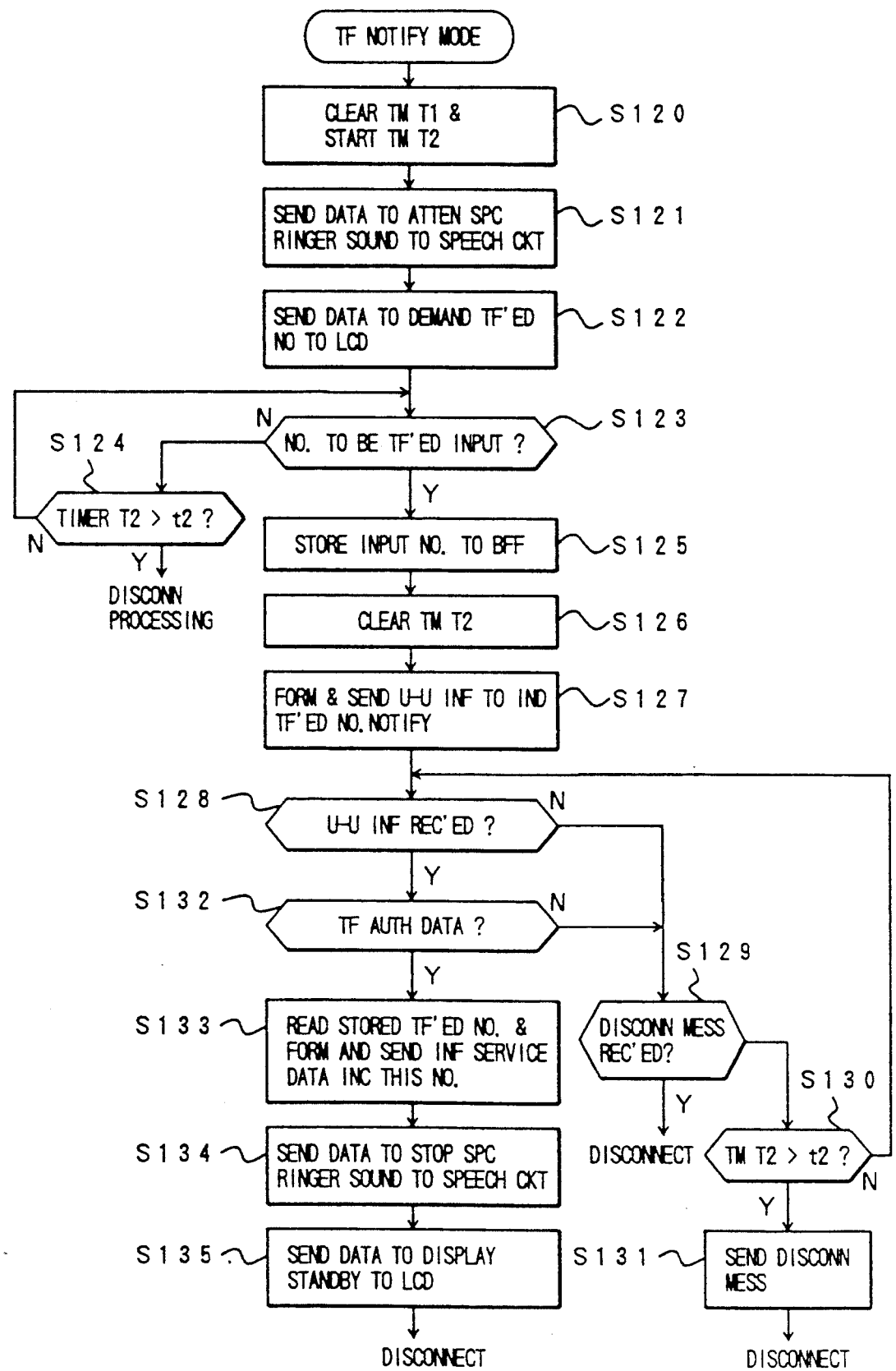
FIG. 13 is a flowchart showing the processing procedure for the transfer notify mode shown in FIG. 7.

In the transfer notify mode shown in FIG. 13, the point different from the other modes as already described is that the character message indicative of a demand for inputting the terminal unit number to which the personal call is to be transferred is displayed on the liquid crystal display unit 301 in the step S122. If no terminal number to which the personal call is to be transferred is inputted through the dial key matrix 303 within the predetermined time period t2 after this message has been displayed, the control section 331 enters the disconnect processing (S123, S124). If inputted, the number is stored in the buffer area (S125). Subsequently, the information indicative of the number to which the personal call is to be transferred is formed as the user-user information, and sent to the calling personal side terminal unit (S127). In the calling personal side terminal unit, the control section 331 decodes the user-user information and displays the decoded information as shown in FIG. 21 on the liquid crystal display 301. At the same time, it is also possible to output the speech guidance such as "Would you prefer to transfer to No. xxxxx", in which "xxxxx" indicates the number to which the personal call is to be transferred, simultaneously. In response to this guidance, the calling person inputs his intention of transfer authorization or non-authorization in accordance with a predetermined way. The inputted authorization or non-authorization information is sent to the called person side terminal unit as the user-user information.

In the called person side terminal unit, upon the reception of the user-user information indicative of transfer authorization or non-authorization sent from the calling person side terminal unit (S128, S132), the control section 331 reads from the buffer area the number to which the call is to be transferred, forms the information service data including this read number, and sends it to the user's bus 1 (S133). This information service data is received by the exchange unit 7, so that the exchange unit 7 transfers the personal call to the terminal unit of the number to which the call is to be transferred. After the information service data has been transmitted, the specific ringer sound is stopped in the called person side terminal unit (S134), and a display indicative of standby is displayed on the liquid crystal display 301 (S135). Thereafter, the control section 331 proceeds to the disconnect processing.

As described above, in the transfer mode, the inquiry as to whether the transfer is authorized or not is sent to the calling person. Only when the calling person authorizes the transfer, the personal call is transferred to the called person himself. When the calling person does not authorize the transfer (S132, S129), the control section 331 enters the disconnect processing, and therefore the communication ends automatically.

Further, in the transferred side terminal unit, the transferred call is processed as an ordinary call (station call), not as a personal call.

The operation of the calling personal side terminal unit is roughly the same as in the proxy answer mode #2. The points different therefrom are that the data analyzed in the step S154 shown in FIG. 22 are data indicative of the transfer of the personal call and the number to which the call is to be transferred, and that the message display and the speech guidance in the steps S155 and S156 indicate the transfer of the call and the number to which the call is to be transferred.

An embodiment of the present invention which applied to the ISDN communication system has been described hereinabove, by way of example. Without being limited, however, the present invention can be also applied to the PSTN (Public Switched Telephone Network) system. In this case, DTMF (Dual-tone Multifrequency) signals and other data-modulated speech signals are used as the control data communicated between the terminal units.

What is claimed is:

1. A personal communication system in which a call is originated from a calling side terminal equipment using number information allocated to a called person and the call is processed on the called side terminal equipment as a personal call, the system comprising:

absence notifying means disposed on the called side terminal equipment, for sending absence notify information to the calling side terminal equipment when a predetermined absence notify request is entered during a processing of the personal call.

personal call release means disposed on the calling side terminal equipment, for transmitting a personal call release signal to the called side terminal equipment when a predetermined personal call release request by the calling person is entered;

personal service releasing means disposed on the called side terminal equipment for allowing unspecified persons to answer the personal call when the personal call release signal is received.

2. The personal communication system of claim 1, wherein said personal service releasing means issues a notification indicative of a request for answering the personal call to unspecified persons when the personal call release signal is received, and allows the system to proceed to speech status after the personal call is answered.

3. The personal communication system of claim 1, wherein said absence notifying means modifies a ringing sound with respect to the personal call incoming, when the absence notify request is entered.

4. The personal communication system of claim 3, wherein the modification of the ringing sound is to attenuate volume of the ringing sound.

* * * * *